July 12, 1966     D. L. ARMSTRONG ET AL     3,260,275

REGULATOR

Original Filed Oct. 12, 1961     2 Sheets-Sheet 1

INVENTORS
DONALD L. ARMSTRONG
WILLIAM L. MACFADDEN

BY Cushman, Darby & Cushman
ATTORNEYS

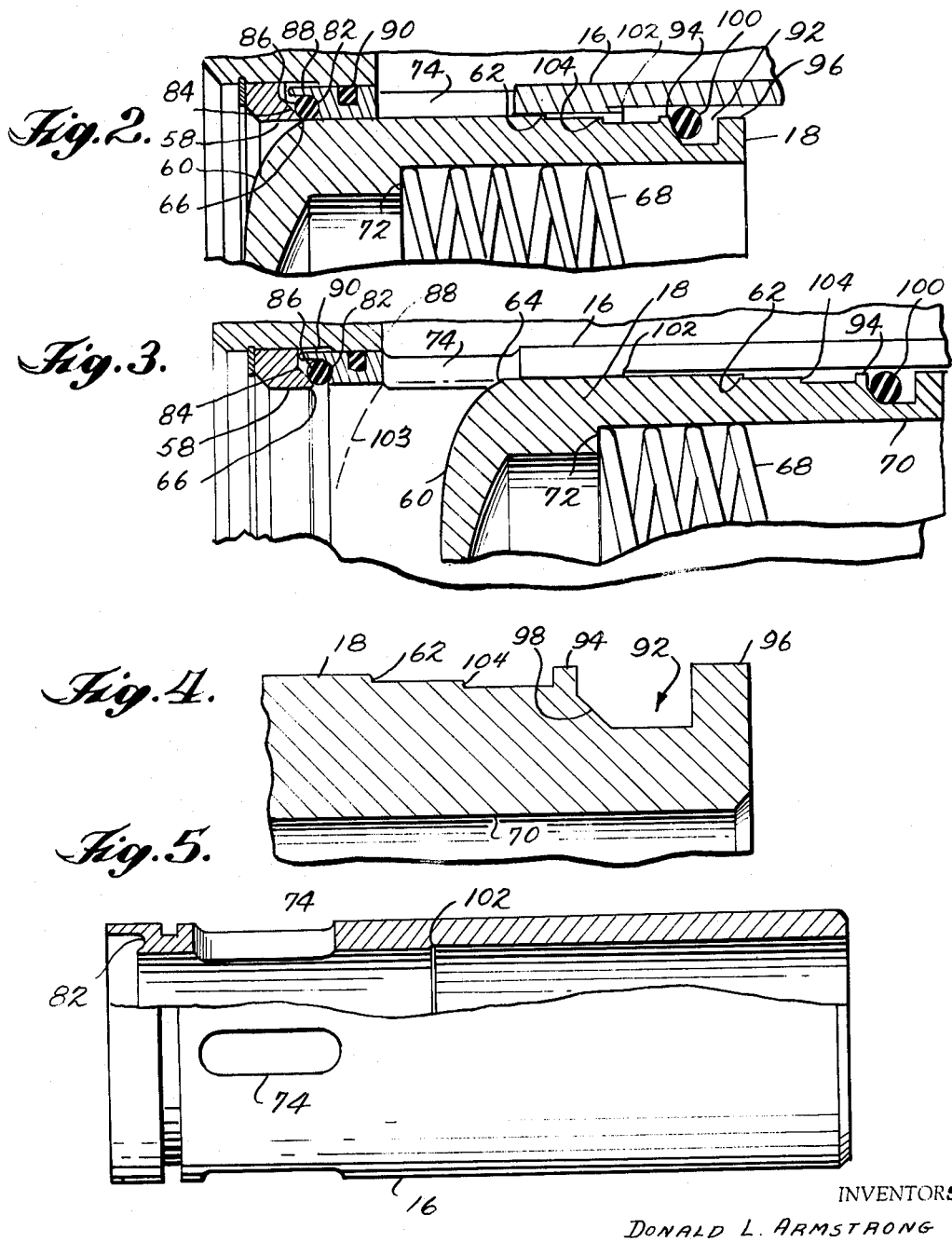

United States Patent Office 3,260,275
Patented July 12, 1966

3,260,275
REGULATOR
Donald L. Armstrong, Sheridan, Ark., and William L. MacFadden, Anderson, Ind., assignors, by mesne assignments, to Rockwell Manufacturing Company, Pittsburgh, Pa., a corporation of Pennsylvania
Continuation of application Ser. No. 144,734, Oct. 12, 1961. This application May 18, 1964, Ser. No. 370,148
(Filed under Rule 47(a) and 35 U.S.C. 116)
6 Claims. (Cl. 137—219)

The present invention is a continuation of Serial No. 144,734, filed Oct. 12, 1961, and now abandoned.

The present invention relates to fluid regulating devices and particularly to fluid pressure regulating devices which are extremely sensitive.

The present invention constitutes an improvement upon certain features of the invention set forth in the copending application of Howard D. Clark, Serial No. 851,716, filed Nov. 9, 1959, and assigned to the assignee of the present invention now matured into United States Letters Patent No. 3,092,133 issued June 4, 1963.

The aforesaid patent describes and claims an axial flow type fluid regulator characterized in part by a piston slideable within a cylinder with certain sealing devices between the piston and cylinder for preventing undesired fluid flow.

The present invention, as will become more apparent hereinafter, constitutes an improvement upon this type of regulator by eliminating or reducing the friction of sealing devices acting between a piston and cylinder.

Accordingly, it is a primary object of this invention to provide a means for reducing friction between a piston and cylinder in a fluid regulating device.

It is a further object of this invention to provide a minimum friction arrangement by causing fluid pressure and flow within the device to alter the position of a sealing means.

Further objects and the entire scope of the invention will become apparent from the following detailed description of an illustrative embodiment of the invention and the appended claims. The illustrative embodiment may be best understood with reference to the accompanying drawings wherein:

FIGURE 2 shows a view in cross-section of a portion of the device of FIGURE 1.

FIGURE 3 shows the same details as FIGURE 2, except with the piston of the device in another position.

FIGURE 4 shows in cross-section a portion of the piston of the device shown in the preceding figures.

FIGURE 5 shows a view partially in section of a cylinder which is part of the device shown in the preceding views.

Figure 1:
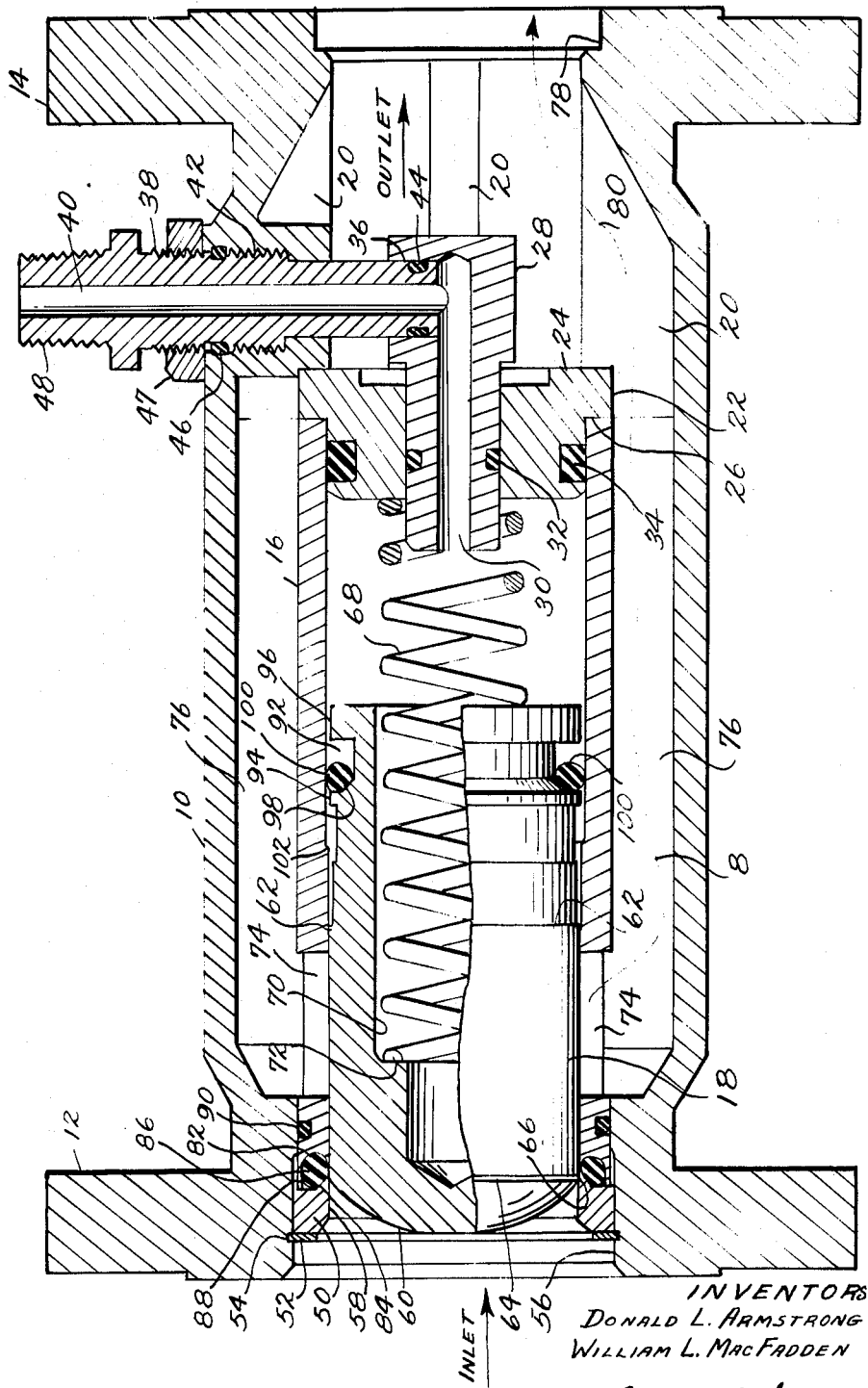
FIGURE 1 shows a cross-sectional view of a fluid regulating device having features in accordance with the invention.

Referring now to FIGURES 1–5 inclusive, a single embodiment of the invention is shown, and like parts have received the same reference characters in all views. As this description proceeds, it will become fully apparent that all of the parts mentioned hereinbelow are circular in cross-section and therefore numerous cross-sectional views have been thought unnecessary.

The illustrative embodiment is comprised of a body or casing 10 having an inlet end flange 12 and an outlet end flange 14 for the usual connection to inlet and outlet pipes (not shown). Within the casing and centrally thereof is a cylinder 16, shown alone in FIGURE 5 and also shown as part of the combination in FIGURES 2 and 3. Within the cylinder there is provided a piston 18 shown in FIGURES 1–4.

The casing or body 10 toward the right hand or outlet end is provided at four equally spaced points with ribs 20 extending inwardly thereof, and provided with notches 22 in which is seated an annular member 24 itself having a shoulder 26 which receives the right hand end of the cylinder 16, all as shown in FIGURE 1. Centrally of the member 24 is a conduit member 28 which protrudes through an aperture in the center of member 24 and is provided with a central passage 30. A resilient sealing ring 32 provides a fluid-tight fit between members 24 and 28, and a further resilient sealing ring 34 provides a tight fit between member 24 and the cylinder 16.

Fitted into an aperture 36 in member 28 is a further conduit member 38, having a passage 40 therein which communicates with the passage 30. Member 38 fits within a threaded aperture 42 in casing 10. Sealing ring 44 acts between members 28 and 38, and sealing ring 46 acts between member 38 and casing 42. Nut 47 locks member 38 to the casing 10. The outer end of member 38 is provided with screw threads 48 for attachment to a fluid pressure line (not shown).

At the left hand end of cylinder 16 as shown in the drawings, there is provided a metal valve seat ring 50 which is retained against movement to the left by a snap ring 52 placed in a groove 54 in the inside bore 56 of the inlet end of the casing 10. The internal diameter 58 of the valve seat ring 50 is slightly less than the outside diameter of the piston 18 in the region between the head 60 of the piston and a point 62 on the skirt or right hand end of the piston 18 whereat the diameter is reduced. The head 60 of piston 18 is preferably beveled in a region 64 at the extreme end of the cylindrical surface, for accurate seating directly against the seating edge or lip of the valve seating ring 50, this lip being designated by reference character 66.

Within the cylinder 16 is a spring 68 which is under compression. At its right hand end this spring encircles the protruding end of member 28 and rests upon the left hand face of annular member 24. At its other end the spring 68 protrudes into a central aperture 70 in the piston and bears upon a shoulder 72 therein. It will thus be observed that the spring tends to both seat the member 24 in the notches 22 in the ribs 20 and also urges the area 64 of the piston into seating engagement with the lip area 66 of the valve seat ring 50.

The cylinder 16 is provided with four ports 74 spaced equally about the periphery thereof near the left hand end of the cylinder. These ports communicate with the channel or passage 76 formed by the casing 10 and the cylinder 16. This passage exists all the way to the outlet 78 in the flange 14, the passage being exemplified by the arrow 80 of FIGURE 1.

At the head of the piston the left hand end of cylinder 16 is provided with a semi-circular groove 82 which faces a beveled or inclined edge 84 in the valve seat ring 50. Within the space thus provided is a resilient sealing ring 86. The cylinder 16 is supported with respect to the valve seat ring 50 by a shoulder 88. The cylinder 16 at its left hand end is otherwise sealed to the casing 10 by sealing ring 90.

Near the right hand or skirt end of the piston 18 is provided an annular groove 92 formed between the portions 94 and 96 of the piston, these ridge or ring portions being of outside diameter equal to that of the piston between the head and the point 62. The corner of this groove 92 is preferably beveled as indicated by reference character 98. Within groove 92 is placed a resilient sealing or O ring 100. As will be explained hereinafter, the sealing ring 100 in one position of the piston may be in engagement with the inside wall of the cylinder 16 as shown in FIGURES 1 and 2. In other positions of the piston, the ring 100 will be out of engagement with the inside surface of cylinder 16, as shown in FIGURE 3.

The internal diameter of cylinder 16 is preferably enlarged slightly beginning at point 102 and extending to the right hand end of the cylinder. Additionally, the outside diameter of the piston is preferably further reduced at the point 104, to the skirt end of the piston from point 62 and intermediate point 62 and the upstanding annular ridge portion of the piston portion 94.

The operation of the device hereinabove described is as follows: Assuming a given fluid pressure at the inlet end of the device, if fluid under a given control pressure is introduced through passages 40 and 30 to the interior of the cylinder 16 this fluid pressure plus the force exerted by spring 68 will force the piston to the left so that its area 64 will snugly seat upon the area 66 of the valve seat ring 50. It will furthermore be assumed that the fluid pressure existing in the passage 76 and in the outlet line is less than the fluid pressure existing within the cylinder 16. Under these circumstances the sealing ring 100 will expand into engagement with the inside surface of the cylinder 16. This expansion of the ring 100 outwardly along the inclined or beveled surface 98 is attributable to the fact that within the cylinder there is a given fluid pressure, while due to fluid movement between the piston and cylinder to the ports 74 there is a lesser fluid pressure therein. Stated otherwise, taking the point of engagement of ring 100 in FIGURES 1 and 2 with the cylinder as a point of reference, to the right thereof as viewed in the drawings there is a given relatively high fluid pressure, which can easily pass the clearance between the portion 96 of the piston skirt and the inside cylinder wall. However, to the left of said point of engagement of the ring 100 with the cylinder there is a lesser pressure, which is that of the outlet side. This differential in pressure acts to urge the ring 100 into engagement with the cylinder wall.

In the position of the piston as shown in FIGURES 1 and 2, it may also be observed that the sealing ring 86 will be contracted so as to engage the piston just to the right of the beveled area 64. Therefore, in the state of affairs shown in FIGURES 1 and 2, the apparatus is closed to the movement of fluid from the inlet or from the inside of the cylinder into the ports 74. It may be remarked that the usual use of the device is to connect the passage 40 over to the inlet pressure at least when it is desired to close the valve and prevent flow into the outlet side.

Now let it be assumed that the control fluid pressure within the cylinder 16 applied through passages 30 and 40 is reduced so that the pressure thereof exerted to the left on piston 18 plus the force of the spring is insufficient to maintain the piston in position against the inlet pressure. As soon as the pressure within cylinder 16 is reduced enough to just permit the piston to begin movement to the right, fluid will begin to pass between the area 64 of the piston head and the area 66 of the valve ring 50. It is understood there can be fluid passage between the piston and the cylinder even to the left of the point 62 whereat the diameter of the piston is reduced. The fluid tending to flow past the sealing ring 86 on its way to the exhaust ports 74 will increase the pressure in the vicinity of the ring 86. By virtue of ring 86 being confined at its sides between the surface 82 of cylinder 16 and the inclined surface 84 of the valve seat ring 50, the pressure on the inside of the ring 86 will tend to expand it and lift it away from the surface of the piston accordingly, frictional resistance to the further movement of the piston imparted by ring 86 is eliminated. If in a particular design the ring 86 does not lift off the piston, then there is an effective seal until the piston moves a bit further and the area 64 clears the ring.

As soon as the valve opens at areas 64 and 66, or the piston head clears the ring 86, there is a movement of fluid from the inlet around the piston and to the right along its length toward the position of sealing ring 100. Some of this fluid moves out through the ports 74. However, due in part to the presence of the zones of greater clearance between cylinder 16 and piston 18 between the points 62 and the ridge 94, fluid from the inlet is attracted thereinto, these zones having been at the relatively low outlet pressure when the valve was closed. The appearance of greater fluid pressure at the point where ring 100 engaged the cylinder wall tends to equalize pressure to either side of ring 100. In fact, the pressure within cylinder 18 may have been reduced well below the inlet pressure in order to allow the latter to overcome spring 68. Under these conditions the ring 100 contracts inwardly so that it no longer engages the cylinder wall. At this point in the operation, any frictional resistance imparted to the piston because of the engagement of ring 100 with the cylinder wall is eliminated and the piston is free to move without hindrance of the sealing ring which otherwise gave a tight seal. After the ring 100 has contracted the air dams formed by the regions of lesser piston diameter between points 62, 104 and the ridge 94 control the fluid flow out of the cylinder.

FIGURE 3 shows the piston at an operating position it would assume when a considerable amount of fluid is to be passed through the ports 74 to the outlet. The chain line 103 in FIGURE 3 shows the position of the piston for valving a lesser quantity of fluid to the outlet. In general, it will be understood that the piston will assume some position relative to the ports 74 so that the desired regulation of flow will occur. However, the movement of the piston will be free of friction resistance by the sealing ring 100 for all of its movements until it moves to such a left hand position that flow of fluid from the inlet is stopped either by the sealing ring 82 or engagement of areas 64 and 66, or both.

It will now be apparent that a fluid regulating device is provided wherein for the closed position thereof a tight resilient sealing is effected, but while the device is open and performing a regulating function, the undesirable friction of the resilient sealing means is eliminated.

Suitable dimensions for an exemplary embodiment of regulator according to the invention are as follows: scale the herewith drawings, using 2 inches as the outside diameter of the piston head as a reference. As for tolerances not readily available by scaling the drawings, allow a clearance of 0.004 inch between the piston and cylinder. At point 102 of the cylinder increase the diameter by 0.020 inch. At point 62 of the piston reduce its diameter by 0.007 inch at point 104 further reduce the piston diameter by 0.010 inch. It is to be understood that the above detailed explanation of an illustrative embodiment has been given only for purposes of explanation of the principles of the invention, and no limitation thereto is necessary or intended. The full scope of the invention is to be determined from the appended claims.

We claim:

1. A fluid regulator comprising a casing having inlet and outlet openings at opposite ends, a cylinder member secured within said casing so as to provide a passage between the casing and the cylinder in constant communication with said outlet opening, a seat ring in said inlet opening, a piston slidable between axially spaced apart positions within said cylinder and having a closed end, an annular end area formed on said closed end and engageable with said seat ring when said piston is displaced to one of said positions within said cylinder, resilient means within the cylinder biasing said piston toward said seat ring, means for admitting a control fluid pressure into said cylinder, means defining an external annular groove in said piston adjacent the end remote from said closed end, said annular groove having a peripheral bottom wall surface and an axially inclined annual surface forming an axial continuation of said bottom wall surface and defining a groove region of reduced depth, a resilient sealing ring seated in said groove and having one of its sides facing away from said inclined surface and exposed to said control fluid pressure, the other side of said sealing ring facing toward said inclined surface and being exposed to the fluid pressure at said outlet opening when said piston is in engagement with said seat ring, the combined of axial length of said inclined surface and said bottom wall surface being greater than the relaxed cross-sectional diameter of said sealing ring, said control fluid pressure when greater than the fluid pressure at the other side of said sealing ring being effective to establish a pressure differential for axially shifting said sealing ring into said groove region in engagement with said inclined surface to radially outwardly expand said sealing ring into sealing enagagement with the internal periphery of said cylinder when said piston is in engagement with said seat ring, and means providing fluid communication between said inlet opening and said other side of said sealing ring when said control fluid pressure is reduced and said piston is moved to open said inlet opening to axially urge said sealing ring into the region of said groove delimited by said bottom wall surface, the depth of said groove in the region of said bottom wall surface being sufficiently great that said sealing ring is out of contact with the internal periphery of said cylinder.

2. In the fluid regulator defined in claim 1, said seat ring being a metal ring having an internal diameter slightly less than the adjacent periphery of said piston and having an annular axially facing area adapted to be directly engaged by said annular end area on said piston.

3. In a fluid regulator defined in claim 1, means defining an annular inwardly open recess surrounding said piston adjacent said seat ring and a resilient seal ring in said recess contracted around the piston periphery when the piston is in position to close said inlet opening.

4. In the fluid regulator defined in claim 3, said recess being axially defined by opposed faces on said seat ring and the end of said cylinder.

5. In a device for regulating the flow of a fluid, means defining a cylinder, a piston having a closed end exposed to inlet fluid pressure at one end of said cylinder and an integral skirt axially slidable between spaced apart positions within said cylinder, a rigid metal seat ring mounted in axially spaced relation to said one end of said cylinder, an internal axially extending annular lip formed on said seat ring and terminating in an annular surface abuttable with a corresponding annular surface on the end of said piston when said piston is moved to one of said positions, a first resilient sealing ring laterally confined in the space between said cylinder and the metal seat ring and contractingly surrounding said integral skirt when said piston is in said one position, inlet means for admitting fluid under pressure into said one end of said cylinder, means for introducing a control fluid pressure within said cylinder for urging said piston against said inlet pressure to said one position, at least one fluid escape port in said cylinder adjacent said one end of said cylinder, means for venting said port to a region of fluid pressure less than said inlet pressure, means defining an external annular groove in said skirt of said piston adjacent the end thereof remote form said closed end, said annular groove having a peripheral bottom wall surface and an axially inclined annular surface forming an axial continuation of said bottom wall surface and defining a groove region of reduced depth, a second resilient sealing ring seated in said groove and having one of its sides facing away from said inclined surface and exposed to said control fluid pressure, the other side of said second sealing ring facing towards said inclined surface and being exposed to the fluid pressure at said port when said piston is in said one position, the combined axial length of said inclined surface and said bottom wall surface being greater than the relaxed, cross-sectional diameter of said second sealing ring, said control fluid pressure when greater than the fluid pressure at the other side of said sealing ring being effective to establish a pressure differential for axially shifting said second sealing ring into said groove region in engagement with said inclined surface to radially outwardly expand said second sealing ring into sealing engagement with the internal periphery of said cylinder when the annular surface on said piston is in engagement with the annular surface on said lip, and means providing fluid communication between said inlet means and said other side of said second sealing ring to apply inlet fluid pressure to said other side of said second sealing ring when said control fluid pressure is reduced and said piston is moved to disengage from said seat ring to axially urge said second sealing ring into the region of said groove delimited by said bottom wall surface, the depth of said groove in the region of said bottom wall surface being sufficiently great that said sealing ring is out of contact with the internal periphery of said cylinder.

6. A device for regulating the flow of fluid comprising a casing having an inlet opening and an outlet opening, a cylinder mounted in said casing and having an open end adjacent to said inlet opening and an opposite rear end, a metal vavle seat ring mounted in axially spaced, aligned relation to said open end of said cylinder and having an annular lip extending axially toward said open end, said lip terminating at its end remote from said seat ring in an annular surface facing toward said open end, a piston slidable between axially spaced apart positions within said cylinder having a closed end formed with a beveled, annular surface facing and axially aligning with the annular surface of said lip, said piston having a uniformly diametered, cylindrical skirt portion extending rearwardly from the annular surface on said closed end, resilient means biasing said piston to a valve closed position where the annular surface of said piston directly sealingly seats against the annular surface of said lip, means cooperating with said lip and said open end of said cylinder for defining an annular groove having a mouth opening only radially inwardly and axially delimited by the remote end of said lip and said one end of said cylinder, said groove being formed radially outwardly of said mouth with a greater axial length than said mouth, a resilient sealing ring seated in said groove and axially confined between said open end of said cylinder and said seat ring, one portion of said sealing ring peripherally surrounding said lip and the remaining portion of said sealing ring extending axially beyond the annular surfaces on said lip and said piston and contractingly surrounding said skirt portion when the annular surface on the closed end of said piston is in engagement with the annular surface on said lip, said groove having a clearance space for permitting said sealing ring to be expanded radially outwardly from said mouth, said closed end of said piston being directly exposed to inlet fluid pressure at said inlet opening, means for introducing control fluid pressure into said cylinder between said piston and the rear end of said cylinder for urging said piston toward said seat ring, a lateral port in said cylinder closed by said piston when said piston is engaged with the annular surface on said lip to close said inlet opening, said piston being displaceable away from said seat ring by a predetermined differential between said control fluid pressure and the fluid pressure at said inlet opening to provide fluid communication from said inlet opening to said outlet opening, the pressure of fluid flowing through said seat ring upon initial displacement of said piston away from said seat ring acting on the portion of said sealing ring extending axially beyond said lip to urge said sealing ring radially outwardly into said clearance space and out of frictional engagement with said piston.

References Cited by the Examiner
UNITED STATES PATENTS

| | | | |
|---|---|---|---|
| 2,614,793 | 10/1952 | Storm | 137—525 |
| 2,781,997 | 2/1957 | Berck | 251—51 |
| 2,841,359 | 7/1958 | Berck | 251—25 |
| 3,042,431 | 7/1962 | Kryzer | 277—170 |
| 3,092,133 | 6/1963 | Clark | 137—220 |

M. CARY NELSON, *Primary Examiner.*

MARTIN P. SCHWADRON, *Examiner.*

A. JAFFE, S. SCOTT, *Assistant Examiners.*